J. E. DAVIDSON.
METHOD FOR FORMING SHANKS FOR BOOTS AND SHOES.
APPLICATION FILED MAY 19, 1908.
978,278.
Patented Dec. 13, 1910.
2 SHEETS—SHEET 1.
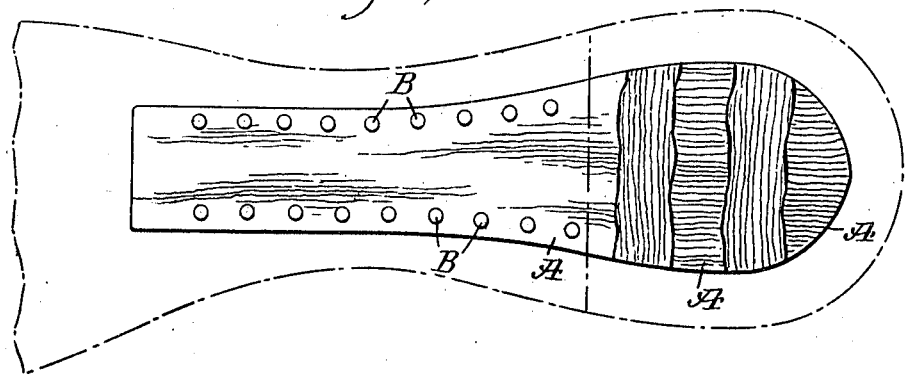
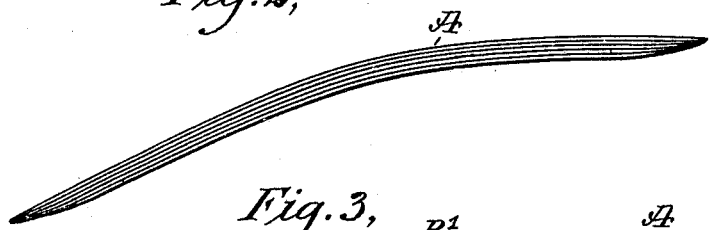
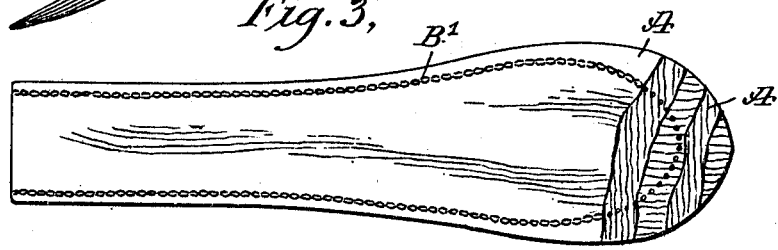
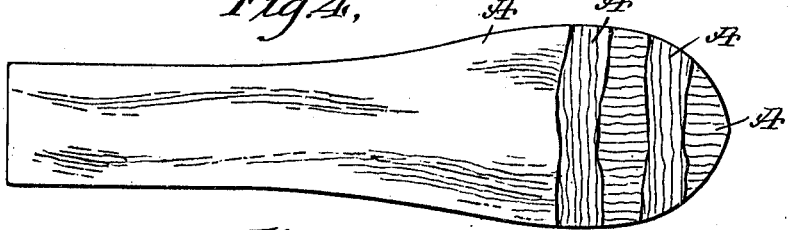
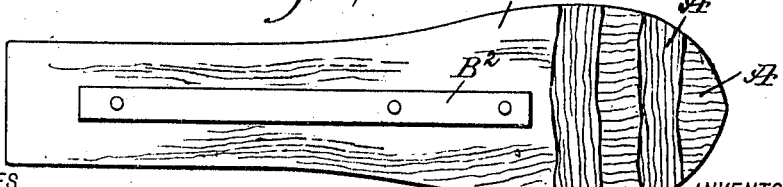
WITNESSES
Edward Thorpe.
INVENTOR
John Edwin Davidson
BY
Munn & Co.
ATTORNEYS J. E. DAVIDSON.
METHOD FOR FORMING SHANKS FOR BOOTS AND SHOES.
APPLICATION FILED MAY 19, 1908.
978,278.
Patented Dec. 13, 1910.
2 SHEETS—SHEET 2.
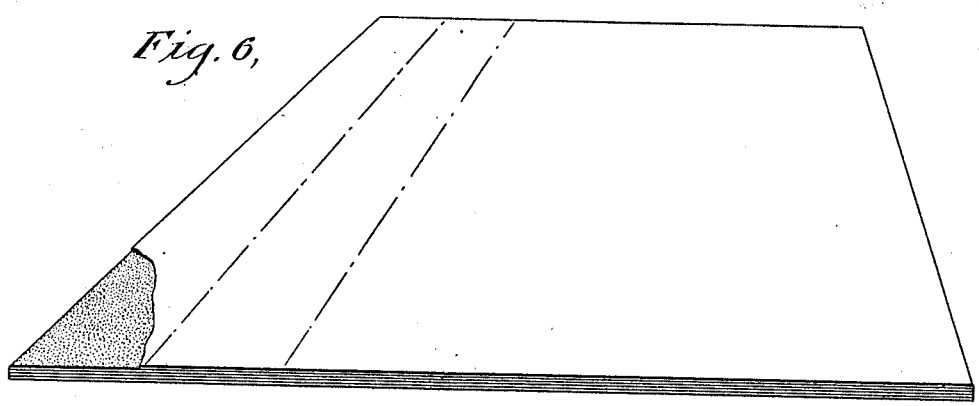
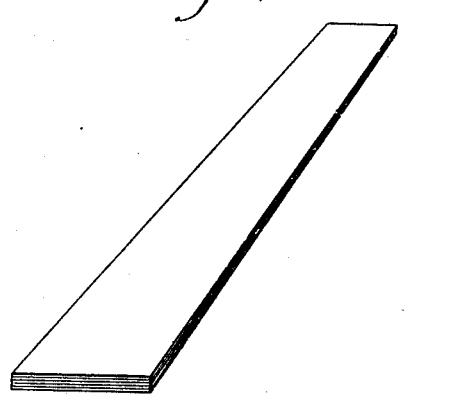
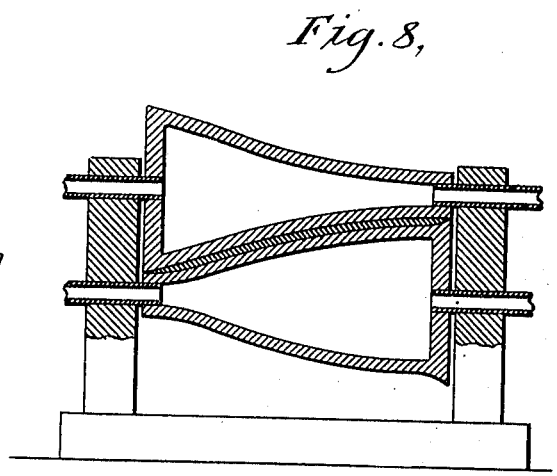
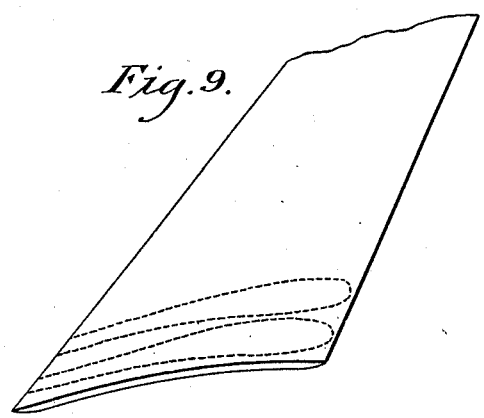
WITNESSES
Edward Thorpe.
Theo. G. Hoster.
INVENTOR
John Edwin Davidson,
BY
Munn & Co.
ATTORNEYS

UNITED STATES PATENT OFFICE.

JOHN EDWIN DAVIDSON, OF TORONTO, ONTARIO, CANADA, ASSIGNOR OF ONE-HALF TO FRANK E. WACHTLER, OF BOSTON, MASSACHUSETTS.

METHOD FOR FORMING SHANKS FOR BOOTS AND SHOES.

978,278.   Specification of Letters Patent.   Patented Dec. 13, 1910.

Application filed May 19, 1908. Serial No. 433,652.

*To all whom it may concern:*

Be it known that I, JOHN EDWIN DAVIDSON, a subject of the King of Great Britain, and a resident of Toronto, in the Province of Ontario, Dominion of Canada, have invented a new and Improved Method for Forming Shanks for Boots and Shoes, of which the following is a full, clear, and exact description.

The invention relates to boots and shoes, and its object is to provide a new and improved method of producing shanks for the same, from laminated wood in a very simple and economical manner, the shank produced not being liable to shrink, swell, check or split, and will retain its shape.

The invention consists of the novel manner of forming the shanks as fully described hereinafter and then pointed out in the claims.

A practical embodiment of the invention is represented in the accompanying drawings forming a part of this specification, in which similar characters of reference indicate corresponding parts in all the views.

Figure 1 is a plan view of a laminated shank reinforced by rivets, parts of successive layers being broken out; Fig. 2 is a side elevation of the same; Fig. 3 is a plan view of a laminated shank reinforced by stitches and parts of successive layers being broken out; Fig. 4 is a plan view of a non-reinforced laminated shank, parts of successive layers being broken out; Fig. 5 is an inverted plan view of a laminated shank reinforced by a steel plate, parts of successive layers of the shank being broken out; Fig. 6 is a perspective view of one of the laminated sheets from which the shank is ultimately produced; Fig. 7 is a perspective view of one of the strips cut from the laminated sheet shown in Fig. 6; Fig. 8 is a central section of a pair of heated pressing rollers for pressing the sheet shown in Fig. 7 to reduce the thickness thereof and to give the permanent arch-shape to the shank; and Fig. 9 is a perspective view of the compressed strip from which the shanks are finally cut.

Up to the present time, shanks for boots and shoes have been made in various ways and from various materials about as follows:

First, for the cheapest boots and shoes a shank formed of an ordinary piece of plain wood has been used, which is cut from the log by the rotary veneer process, the shank being slightly curved to form a minute arch, and the shank being made in various widths and lengths according to the type of boot or shoe for which the shank is intended. The arch referred to is not liable to remain permanent for any length of time when placed in the boot or shoe, for the reason that as soon as dampness comes in contact with the shank either from the foot or from the pavement, the shank flattens out and practically becomes useless for the purpose for which it was originally intended.

Second, for another grade of boots and shoes, a shank has been made from leather board. This material is molded when damp and cut out by dies to the required shape and size and when dry has some slight resistance. A shank made of this material does not possess much merit in itself as it flattens when exposed to dampness and by the weight of the body brought to bear upon it. In order to overcome the flattening out of the shanks above referred to, a thin strip or plate of steel has been used on the under side of the shank, the strip being given the desired arch shape to properly support the foot. This reinforced shank is called a combination shank and is used in another grade of both men's and women's shoes.

Third, for the best class of boots and shoes leather shanks are used, supported at the under side by a steel spring fastened to the shank the same as the leather board shank. So far as known to applicant, the above are practically the only three kinds of shanks now used in the boot and shoe trade, none of which has given entire satisfaction. A steel support cannot be fastened to the wooden shank on account of splitting of the wood, and when applied as a support to the leather board shank and the leather shank, difficulty is experienced in fastening the shank to the inside of the boot or shoe. The steel strip or plate referred to is also liable to break and work out of position, thereby cutting the stitches and otherwise doing damage to the boot or shoe to a very considerable extent. The steel plate of the shank is also liable to flatten out in a short time on account of the unevenness of the temper of the steel plate, and consequently the arch of the shoe or boot is not supported in the proper manner.

In order to overcome the above-described difficulties, I provide a shank formed of layers A of wood, cemented together and permanently pressed into arch shape. In case an extra support is required, then the shank is greatly reinforced, for instance, by rivets, nails, tacks or the like B, as shown in Fig. 1, passed through the several layers along the side margins of the shank, or the layers A may be reinforced by stitches B' passing through the layers, as indicated in Fig. 3, or, if desired, the shank may be reinforced at the under side by a steel plate B², riveted or otherwise fastened to the shank, as indicated in Fig. 5.

In order to produce the laminated shank, I proceed in the following manner: Thin layers of wood, produced preferably by the rotary veneer process, are placed one on top of the other with the grains at right angles and with the layers coated with a waterproof cement or other binding substance. A sufficient number of layers are placed one on top of the other in the manner described, to form a laminated sheet of wood of a desired thickness, as shown in Fig. 6. The laminated sheet, after being built up as described, is subjected to a heavy pressure and allowed to remain under this pressure until the cement or other binding substance has set sufficiently to cause a firm adherence of the layers. While the binding substance is still in a plastic condition, the sheet is cut by the use of knives or saws into strips, of a width corresponding to the length of the shank (see Fig. 7), and then each strip is passed through successive sets of pressing rollers (see Fig. 8), heated to a temperature of about 100° F. Each set of pressing rollers consists of a male and a female roller, corresponding to the shape to be given to the shank (see Fig. 2), and the pressing rollers are so arranged that extra pressure is brought to bear on the sides of the strip, to reduce the material at the sides to feather edge by pressure, without disturbing the laminations (see Figs. 2 and 8). The strip is passed successively through sets of such heated and reducing pressing rollers, to gradually compress the strip to a desired thickness, it being understood that the heat transmitted by the rollers to the binding substance, which is in a damp or plastic state, has the effect of steaming the layers to a proper degree, which causes the strip to be molded into the desired form without danger of breaking the grains, and as the strip proceeds through the consecutive rollers, the cement or other binding substance becomes indurated or hardened, so that the arch shape given to the strip is fixed permanently, and the shank cut from the strip is not liable to lose its arched shape when in use in the boot or shoe. The strip produced in the manner described and shown in Fig. 9 is then taken to an automatic machine provided with cutting dies which cut each strip transversely into shanks of the required outline, thus completing the shank.

A shank constructed in the manner described is not liable to shrink or swell and will not check or split or lose its shape relative to the arch, and as any desired number of layers may be used, it is evident that any desired degree of resiliency or rigidity may be given to the shank, to render the latter suitable to all grades of shoes, from those used by children to those used by persons employed to do heavy work, such as miners or other artisans. In practice, I prefer to make the shank of more layers having a grain running lengthwise, than transversely; say in a five-layer shank the grains of three of the layers run lengthwise, while the grains of the other two layers run transversely. By compressing the shanks at the ends during the process of manufacture, it is evident that the usual shaving of the shanks is entirely dispensed with.

The shank shown and described may be sewed or nailed to the interior part of the boot or shoe without injury to the shank, and the shank thus used forms a permanent support for the instep of the foot, and is not liable to lose its shape during the life of the boot or shoe.

The improved shank is very light when compared with the various shanks now in use in a shoe, as above referred to, and by its construction great strength is obtained without addition in weight, and at the same time it does not unduly fill the boot or shoe.

The woods suitable to produce the improved shank are numerous and may be designated as sap woods, namely, birch, beech, elm, ash, maple, bass wood, alder, spruce, gum wood and the like. The woods referred to are capable of being cut by the veneer or rotary process, but it is evident that I do not confine myself to producing the thin layers of wood in this manner, as the layers may be produced by slicing, sawing or other processes.

Having thus described my invention, I claim as new and desire to secure by Letters Patent:

1. The herein described method of forming laminated shanks for boots, shoes and like footwear, consisting of superimposing layers of wood coated with a binding substance and having the grain of successive layers running at an angle one to the other, the superimposed layers forming a laminated sheet, then subjecting the laminated sheet to pressure, then cutting the sheet into strips of a width corresponding approximately to the length of a shank, and finally subjecting the strip simultaneously to pressure and to heat to compress the layers and bend the same into arch-shape in the direction of the width of the strip.

2. The herein described method of forming laminated shanks for boots, shoes and like footwear, consisting of superimposing layers of wood coated with a binding substance and having the grain of successive layers running at an angle one to the other, the superimposed layers forming a laminated sheet, then subjecting the laminated sheet to pressure, then cutting the sheet into strips of a width corresponding approximately to the length of a shank and finally subjecting the strip simultaneously to pressure and to heat to compress the layers and bend the same into arch-shape in the direction of the width of the strip, and finally cutting the strip transversely to form the finished shank.

3. The herein described method for forming shanks for boots and shoes, consisting in forming a laminated sheet of wood, cutting the sheet into strips of a width corresponding approximately to the length of a shank, subjecting the strip simultaneously to pressure and heat to compress the strip and bend the same into arch shape in direction of the width of the strip, and finally cutting the strip transversely to form the finished shank.

4. The herein described method for forming shanks for boots and shoes, consisting in cutting a strip of a width corresponding approximately to the length of a shank from a laminated sheet of wood, subjecting the strip simultaneously to pressure and heat to compress the strip, reduce the material at the sides to feather edge and bend the same into arch shape in direction of the width of the strip, and finally cutting the strip transversely to form the finished shank.

In testimony whereof I have signed my name to this specification in the presence of two subscribing witnesses.

JOHN EDWIN DAVIDSON.

Witnesses:
E. L. GOODWIN,
CHARLES J. ELLIOTT.